Sept. 12, 1961  A. G. SCHILBERG  2,999,312
FLANGE REINFORCED EMBOSSMENT
Filed Dec. 29, 1955

INVENTOR.
ARNOLD G. SCHILBERG
BY
Andrus & Sceales
Attorneys

United States Patent Office

2,999,312
Patented Sept. 12, 1961

2,999,312
FLANGE REINFORCED EMBOSSMENT
Arnold G. Schilberg, Milwaukee, Wis., assignor to A. O. Smith Corporation, Milwaukee, Wis., a corporation of New York
Filed Dec. 29, 1955, Ser. No. 556,130
1 Claim. (Cl. 29—545)

This invention relates to a flange reinforced bearing structure or embossment which may be employed in a vehicle control arm or other machine element and the method of making the same.

Vehicle control arm elements and other machine elements are commonly provided with an extruded tubular embossment adjacent one or both ends thereof for receiving a shaft or the like. The embossment is generally reinforced by a concentric flange formed coextensively with the embossment and spaced radially therefrom.

Heretofore, the embossment and concentric flange have been formed by a single stroke in a press with the bending operation for forming the flange being completed before the extrusion is begun. This method requires that a considerable radial clearance be provided between the flange and the outer wall of the embossment so that adequate metal is available for a successful extrusion. In the case of a channel-section vehicle control arm element provided with a reinforced bearing structure fabricated in accordance with the flange bending method, it is necessary to utilize a generally elongated blank provided with enlarged end portions for forming the reinforced bearing structures. The enlarged end portions of the blank contour do not permit economical nesting on the original blank material so that a considerable amount of scrap results from the blanking operation.

According to the present invention, a blank is placed between suitable die members and a concentric reinforcing flange for an embossment is formed by extruding the flange simultaneously with the extrusion of the embossment.

The drawing furnished herewith illustrates the best mode of carrying out the invention as presently contemplated and set forth hereinafter.

Figure 5:
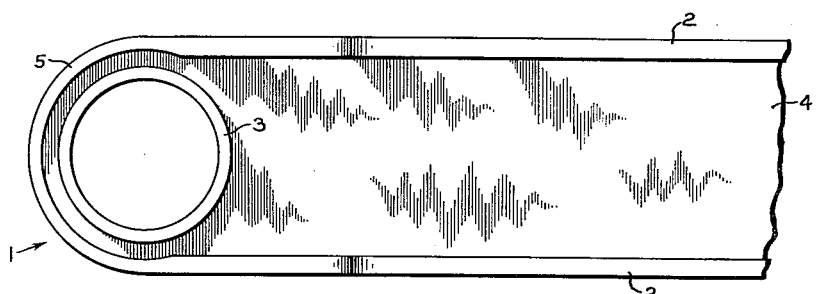
FIG. 5 is a partial plan view of a vehicle control arm element showing a flange reinforced bearing structure made in accordance with this invention.

The method of the invention will be described in connection with the fabrication of a vehicle control arm element 1 as shown in FIG. 5. The element 1 is of generally channel-section having side flanges 2 extending over substantially the length thereof. A tubular embossment of bearing structure 3 is provided in the web 4 adjacent to the end of the element. A reinforcing flange 5 is formed on the end of element 1 concentrically about the embossment 3 and integrally with the side flanges 2.

Figure 1:
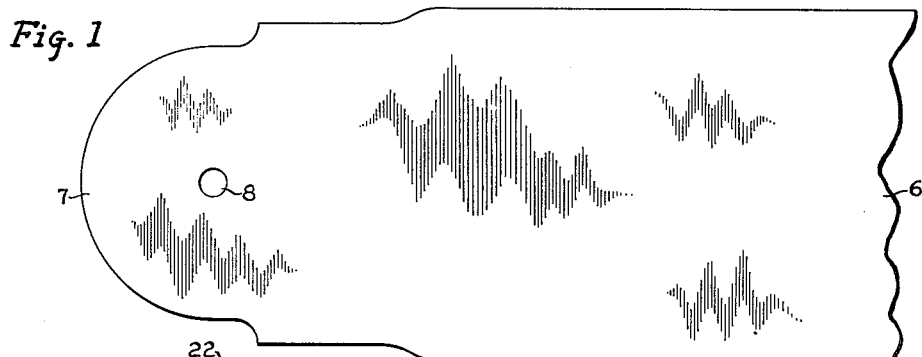
FIGURE 1 is a fragmentary plan view of a blank for a vehicle control arm element showing the end portion thereof which is to be provided with a flange reinforced embossment or bearing structure in accordance with the invention.

The element 1 is formed from a generally elongated blank 6 having an end portion 7 of reduced width as shown in FIGURE 1. The blank end portion 7 is provided with a small hole 8 at the center of the predetermined location of the embossment 3 to serve as a guide for the die members and to prevent tearing of the blank material as the die members move together. The end of the blank is rounded on a radius extending from the center of hole 8.

The blank 6 is placed between complementary die members 9 and 10 either or both of which are adapted to move relatively with respect to each other to form the control arm element 1. A suitable knock-out, not shown, may be provided in the lower die member 9 for ejecting the formed element from the die member.

The lower die member 9 is provided with a longitudinally extending recess or cavity 11 having vertically extending side walls 12. A cylindrical punch 13 having a diameter somewhat less than the width of recess 11 extends upwardly from the bottom 14 of the recess adjacent one end thereof. The upper annular edge of punch 13 is generally rounded to prevent tearing of the metal and a small pilot projection 15 extends upwardly from the punch at the center thereof to engage hole 8 in the blank for centering the dies and blank relatively. The semi-cylindrical end wall 16 of recess 11 is formed concentrically about punch 13. The side walls 12 join the end wall 16 on tangents extending from a vertical transverse plane through the center of the punch to form a continuous recess wall. The upper edge of walls 12 and 16 is formed with a rounded approach 17 to prevent tearing of metal.

The complementary upper die member 10 has a cylindrical recess or cavity 18 which provides the die with a downwardly extending longitudinal section 19 having vertical side walls 20 and a relatively thin semi-circular projection 21. In the closed position of the die members 9 and 10, the side walls 20 of section 19 are spaced from the side walls 12 of recess 11 to provide clearance therebetween equal to the blank thickness, and the lower surface of section 19 is spaced from the bottom 14 of recess 11 to provide similar clearance. Section 19 merges into the semi-cylindrical projection 21 and the diameter of the latter is somewhat greater than the distance between the side walls 20 of section 19. Projection 21 is formed concentrically with respect to the end wall 16 of recess 11 of the lower die member 9, and in the closed position of the die members 9 and 10 is spaced inwardly therefrom an amount somewhat less than the blank thickness. Because the distance between the outer surface of projection 21 taken transversely through its center is greater than the distance between the side walls 20, the side walls narrow down to join the projection 21 on a generally smooth curve.

Cylindrical recess 18 is provided in die 10 to receive the punch 13 of the lower die member 9. In the closed position of the die members the vertical wall of recess 18 is concentric with and spaced from the punch to provide an annular clearance whose radial dimension is somewhat less than the blank thickness. Projection 21 is also radially spaced from the punch 13 and the die 9 to provide an annular clearance on both sides of projection 21. A pilot hole 22 is provided in the upper die member centrally of recess 18 to receive the pilot projection 15 on punch 13 and thereby guide the die members as they move relative to each other.

In carrying out the invention, the blank 7 of predetermined contour is disposed over the lower die member 9 with the pilot projection 15 engaging the hole 8 in the blank to properly align the blank with respect to the die. The upper die 10 is then actuated downwardly and in the first instance the lower surface of section 19 and projection 21 engages the upper surface of the blank. As the upper die member 10 continues downwardly, the pilot hole 22 receives the pilot projection 15 to properly align the die members. A simple bending operation forms the blank into a channel-section element between the respective side walls 12 and 19 and between the die section 19 and the bottom 14 of recess 11.

Figure 2:
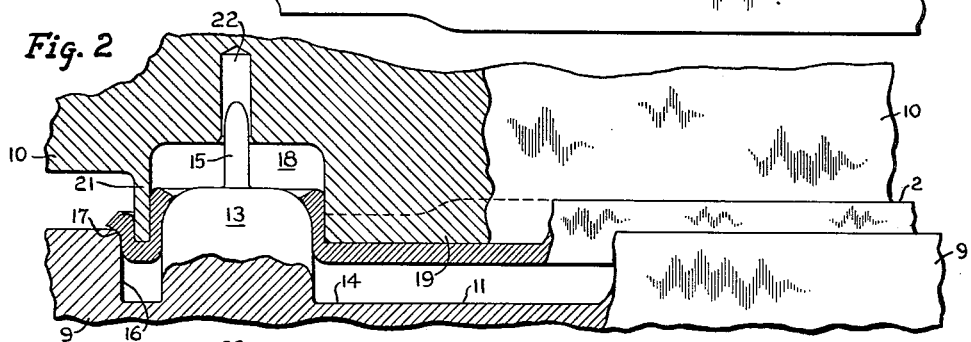
FIG. 2 is a partial longitudinal section showing the formation of the flange reinforced bearing structure on the blank of FIGURE 1 between extrusion die members.
Figures 3, 4:
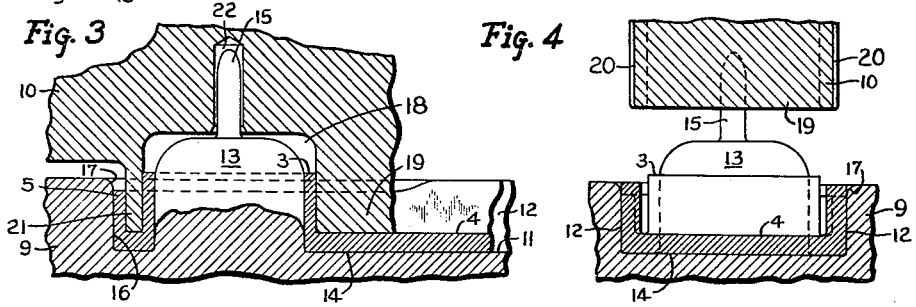
FIG. 3 is a view similar to FIG. 2 showing the flange reinforced bearing structure between the fully closed die members.
FIG. 4 is a sectional view as viewed from the right in FIG. 3 with the die members open, showing the flange reinforced bearing structure.

As the die section 19 and the die projection 21 advance downwardly they start to extrude the metal behind them over the punch 13, as shown in FIG. 2, and progressively push the metal ahead of the punch by a flowing operation to effect a gradual reduction in thickness of the metal in the circular embossment 3. FIGS. 3, 4 and 5 show the extruded embossment 3.

Simultaneously with the extrusion of embossment 3, the concentric end flange 5 is formed on the control arm element 1. As the die projection 21 moves downwardly it causes the metal in end flange 5 to extrude over the rounded edge 17 of recess end wall 16. The metal is progressively pushed ahead of edge 17 by a flowing operation to effect a gradual reduction to the desired thickness of the end flange. While the thickness of end flange 5 is reduced from the original blank thickness, its thickness dimension may or may not equal the wall thickness of embossment 3.

The projection 21 may have any predetermined thickness as long as it has the strength and rigidity to withstand the forming pressures. Generally, the closer the end flange 5 can be placed to the embossment 3 the more efficiently it will operate to reinforce the embossment. A projection 21 having a radial dimension of one-eighth inch or less has been used to successfully extrude blank material of 3/16 inch thickness to each side thereof simultaneously to form the reinforcing flange and the embossment.

The success of the multiple extrusion is somewhat dependent upon the flow characteristics of the metal and the thickness of the stock. The invention is more adaptable to softer drawing steels having a low carbon content, preferably not in excess of .25% carbon. Successful multiple extrusions have been formed from .10–.15% carbon steel blanks having a stock thickness of 3/16 inch.

Further, the edges of the small hole 8 in the blank 6 and the edge of the end portion 7 of the blank should be free of burrs or roughness which might cause a tendency to start a tear.

As shown in FIG. 2 the extrusion of the metal forming the embossment occurs simultaneously with the extrusion of the metal forming the flange portion concentric therewith, and as shown in FIG. 5 both the circular embossment 3 and the flange portion 5 are substantially reduced in thickness as compared to the straight side edge flange portions 2 which have substantially the thickness of the original blank. By reason of this simultaneous extrusion the forces or stresses on the original blank portion between elements 3 and 5 during the extrusion operation are balanced and there is less tendency to tear than with the former process referred to.

As shown in FIGS. 3 and 5, the heighth of flange portion 5 may be less than that of portion 2, making it possible to employ substantially less metal at the end of the blank. Embossment 3, being extruded is shown of great heighth than flange portion 2 and also portion 5.

The term extruding as employed herein refers to the type of forming illustrated in FIGS. 2 and 3 wherein metal of the blank flows ahead of one portion of the die as the dies close together with less space between the opposed portions of the dies than the thickness of the blank.

The extruded flange permits a substantial reduction in blank size over the previous bending methods because less material is required for the flange and the radial clearance between the flange and the bearing extrusion may be substantially reduced. The strength characteristics of the thinner extruded flange remain substantially the same as that for the flange formed by bending as a result of the cold working on the metal. And further, because the extruded flange may be placed closer to the bearing extrusion, it is in a better position to provide reinforcement for the bearing extrusion. In the case of vehicle control arm elements the invention permits utilization of a blank contour wherein the end portions are narrower than the remainder of the blank so that economical nesting on sheet material is possible and scrap loss is greatly reduced during the blanking operation.

Various modes of carrying out the invention are contemplated as being within the scope of the following claim particularly pointing out and distinctly claiming the subject matter which is regarded as the invention.

I claim:

The forming of a flange reenforced cylindrical embossment on a flat metal blank in a single operation, comprising initially expanding a circular portion of the blank surrounding and immediately adjacent a preformed perforation therein by drawing the same over the gradually curved head of a male die member in forming the embossment, progressively extruding the drawn metal to form a tubular embossment on the blank of a thickness substantially thinner than the blank, and extruding a reenforcing flange closely adjacent the tubular embossment and substantially reduced in thickness from the blank, said extruding of the flange being simultaneous with the extrusion of the embossment to provide balanced forces on opposite sides of the intermediate die member and prevent tearing of the metal as occurs where the extruding operations are successive.

References Cited in the file of this patent

UNITED STATES PATENTS

| | | |
|---|---|---|
| 298,224 | Morgan | May 6, 1884 |
| 866,024 | Hansen | Sept. 17, 1907 |
| 1,397,566 | Walter | Nov. 22, 1921 |
| 1,580,930 | Thackray | Apr. 13, 1926 |
| 1,581,680 | Gueritey | Apr. 20, 1926 |
| 1,672,694 | Shrum | June 5, 1928 |
| 1,675,910 | Riker | July 3, 1928 |
| 2,112,653 | MacLennan | Mar. 29, 1938 |
| 2,246,204 | Graf | June 17, 1941 |
| 2,282,588 | Lyon | May 12, 1942 |
| 2,738,575 | Swain | Mar. 20, 1956 |